US006798359B1

(12) United States Patent
Ivancic

(10) Patent No.: US 6,798,359 B1
(45) Date of Patent: Sep. 28, 2004

(54) CONTROL UNIT WITH VARIABLE VISUAL INDICATOR

(75) Inventor: Valdi Ivancic, Huskvarna (SE)

(73) Assignee: Swedish Keys LLC, Morgan Hill, CA (US)

( * ) Notice: Subject to any disclaimer, the term of this patent is extended or adjusted under 35 U.S.C. 154(b) by 498 days.

(21) Appl. No.: 09/690,864

(22) Filed: Oct. 17, 2000

(51) Int. Cl.[7] ............................................. H03M 11/00
(52) U.S. Cl. ..................... 341/23; 345/170; 345/172
(58) Field of Search .............................. 341/23, 22, 20, 341/28; 345/168, 170, 172, 184

(56) References Cited

U.S. PATENT DOCUMENTS

| | | | |
|---|---|---|---|
| 4,551,717 A | | 11/1985 | Dreher ........................ 345/170 |
| 4,897,651 A | | 1/1990 | DeMonte ..................... 341/23 |
| 5,109,355 A | * | 4/1992 | Yuno ........................... 708/142 |
| 5,233,167 A | | 8/1993 | Markman et al. ............ 235/375 |
| 5,389,260 A | | 2/1995 | Hemp et al. ................. 210/652 |
| 5,515,045 A | | 5/1996 | Tak .............................. 341/23 |
| 5,712,661 A | | 1/1998 | Jaeger ......................... 345/170 |
| 5,774,115 A | | 6/1998 | Jaeger et al. ................ 345/172 |
| 5,777,603 A | | 7/1998 | Jaeger ......................... 345/172 |
| 5,786,811 A | | 7/1998 | Jaeger ......................... 345/172 |
| 5,805,145 A | | 9/1998 | Jaeger ......................... 345/172 |
| 5,818,361 A | * | 10/1998 | Acevedo ...................... 341/23 |
| 5,867,149 A | | 2/1999 | Jaeger ......................... 345/172 |
| 5,914,676 A | * | 6/1999 | Akpa ........................... 341/23 |
| 5,962,830 A | | 10/1999 | Wallace ....................... 235/379 |
| 6,046,730 A | | 4/2000 | Bowen et al. ............... 345/168 |
| 6,067,074 A | * | 5/2000 | Lueders ....................... 345/156 |

FOREIGN PATENT DOCUMENTS

| | | |
|---|---|---|
| GB | 2019628 | 10/1979 |
| GB | 2167218 | 5/1986 |
| WO | WO 01/94120 | 12/2001 |

OTHER PUBLICATIONS

IBM Technical Disclosure Bulletin for Keyboard, vol. 33, No. 10A, Mar. 1991.

* cited by examiner

*Primary Examiner*—Albert K. Wong
(74) *Attorney, Agent, or Firm*—Boyle, Fredrickson, Newholm, Stein & Gratz, S.C.

(57) ABSTRACT

A system for controlling an apparatus (11, 21, 31), which system comprises a control unit (13, 23, 33) adapted to transfer control signals to the apparatus dependent on the control data. Said control unit comprises data input means (14, 24, 34, 44) to input said control data, and said apparatus comprises interpreting means adapted to translate said control signal into an action. Aiming to indicate for a user of the control unit, which action the apparatus is arranged to take when activating the data input means, a visual indicator is arranged on said data input means. The invention is characterized in that said data input means comprises a variable presentation means (45, 57), arranged to realise said indicator, wherein said control unit comprises a first storage means (53) adapted to store the visual data presentable with said presentation unit. Preferably, said control unit comprises several separate data input means, each provided with a presentation means, in which each presentation means comprises separate displays, arranged to present a picture dependent on said visual data.

39 Claims, 3 Drawing Sheets

CONTROL UNIT WITH VARIABLE VISUAL INDICATOR

FIELD OF THE INVENTION

The present invention is related to control units arranged with data input means, which control units are devised to transmit control signals dependent on the activation of said data input means. More precisely the invention is related to control units wherein said data input means are devised with variable visual indicators.

BACKGROUND

Each day a great number of electronic equipment are used, for which equipment control signals often are needed or wanted. For this purpose specially adapted control units are often used. Examples of such control units are keyboards for computers, remote controls for TV-sets, stereo recorders or other electronic apparatus, key pads on mobile phones and calculators, etc. Consequently, the term control unit refers both to such that are integrated with the apparatus they are adapted to transmit control signals to, and such control units that can be communicatively connected to different apparatuses for transfer of control signals.

The type of control units referred to is more precisely such that include some form of data input means, e.g. press-down keys, rotary controls, switches, etc. In most cases these data input means are equipped with visual indicators devised to present an indication of the control signal the control unit is devised to emit at the activation of the data input means. In general, the visual indicators consist of preprinted or raised markings. On a keyboard, symbols are used that directly indicate which character the control signal will be interpreted as by the existing computer program in the computer the keyboard is adapted to control. For example, if the "A" button is activated in a text editing program, the character a or A will be shown on the computer screen. Furthermore, certain buttons of the keyboard are devised with indicators that refer to a function or action that is commanded by the control unit at the activation of said button. This concerns the function keys, but also, for example, the return key and the arrow keys. Further, there are on a keyboard a number of keys that will activate alternative actions or characters when pushed simultaneously, in combination with one another, or with other keys. These keys include Shift, Alt, Ctrl and Alt Gr. In some cases these alternative characters are shown with separate indicators on the keys, e.g. all the characters that are activated through a simultaneous holding-down of the upper numeric row and Alt-Gr on a regular PC-keyboard.

Already with two characters indicated on one key, it may be difficult to find the characters one is seeking, even though it is shown on the key. If three or more characters are indicated on the keys, the general appearance of the keyboard will fail to be lucid. A key with several characters implicate, apart from having additional characters on the keyboard, that the characters must be smaller to fit on the key. Alternative characters and functions that are not expected to be used in a greater extent are therefor often not indicated.

On mobile phones, e.g., which have a tendency to become smaller and smaller, there is often both a number and between three and four letters indicated on each key, which key is often very small, around half a centimetre. As a result thereof, the characters indicated on the key become very small, and it is both difficult and time-consuming to write messages with the key pad of the mobile phone. Similar problems exist for most non-stationary control units. One problem is that the aim of making the control units small and flexible to use, in some cases becomes the clean contrary to the aim of designing a control unit which is able to emit a large number of different control signals, whereby the manufacturers often have to compromise.

A solution to this problem that is often used is the use of a menu system on the display of the apparatus the control unit is devised to control. This concerns for instance both computers and mobile phones, but also TV-sets. This basically enables an unlimited range of functions or characters per key, but a consequence thereof is that the indication of which control signals will be activated is shown on another place than on the key.

Another problem related to data input means having visual indicators is that it is predefined during manufacturing which indicators are devised on each key, rotary control, etc. If one only uses some of the existing keys, e.g. on a keyboard, the user has to accept the fact that they may be scattered all over the keyboard. It would of course be desirable if these keys could be arranged on suitable places, for example gathered together in a group or as an optional fingering. If one uses a computer program devised to interpret some keys as special commands, it would also be desirable if it were possible to indicate this as accurately and clearly as possible. This concerns e.g. computer-games or TV-games. Further, it would be desirable to be able to rearrange these special commands to optional keys. The problems with work-related injuries which are more and more apparent and related to working with a mouse pointer, make it desirable to transfer more and more functions and characters to the keys.

In computer software, often in the operative system, there are decoding systems that are devised to decide how the pressed buttons on the keyboard should be interpreted. These decoding systems are often adjustable so that different keyboard configurations can be enabled. Thus, it is possible, for instance, to change the alphabet from Roman to Cyrillic, or to Japanese characters. However, a reconfigured keyboard becomes difficult to master since the indications on the keys remain unchanged.

In WO97/45794, a computer without a traditional keyboard is shown, and the computer is instead devised with two screens. One screen is used for data input, for example by direct writing on the screen through the use of a suitable pen unit. The screen can also be devised to show pictures and functions of a keyboard where even different alphabets can be used. One inconvenience with the presented solution is however that the feeling of working with separates keys is lost, at which one must be very accurate to guarantee that the fingers do not glide out of the desired finguring. Another inconvenience is that the input screen must be of a touch-screen type, which is considerably less robust than traditional keys.

The object of the present invention is, thus, to supply control units with data input means that overcome the problems with the prior art as mentioned above.

One aspect of the object is to supply a control unit which in a simple way can be configured to be adapted to different users or purposes.

An additional aspect of this object is to supply a control unit having a limited number of data input means and being arranged to emit a large number of different control signals without limiting the accessibility to the corresponding characters and functions.

SUMMARY OF THE INVENTION

With the object to solve the above-mentioned problems, the present invention refers to a system for controlling an apparatus, which system comprises a control unit adapted for transmission of control signals to the apparatus, dependent on control data. Said control unit comprises data input means for input of said control data, and said apparatus comprises interpreting means adapted to translate said control signals to an action. For the purpose of indicating to a user of a control unit which action the apparatus is set to take at the activation of the data input means, a visual indicator is provided on said data input means. The invention is characterized in that said data input means comprises a variable presentation means, devised to realise said indicator, whereby said control unit comprises a first storage means adapted to store appearance data which is presentable by means of said presentation means. Preferably said control unit comprises a plurality of separate data input means, each equipped with a presentation means, where each presentation means comprises between themselves separate displays devised to present an image dependent on said appearance data.

In a preferred embodiment, said displays are LCD's with a plurality of pixels, whereby said appearance data includes pixel data. Said control unit can be a remote control to said apparatus, wireless or connectable through a cable. Examples of such embodiments are remote controls for TV-sets and video recorders, or other electronic apparatus. Another example is the keyboard for a computer. The control unit can also be integrated with said apparatus, for example the key pad on a mobile phone.

BRIEF DESCRIPTION OF THE DRAWINGS

Preferred embodiments of the invention are described in detail below with references to the accompanying drawings, on which.

DETAILED DESCRIPTION OF PREFERRED EMBODIMENTS

Figure 1:
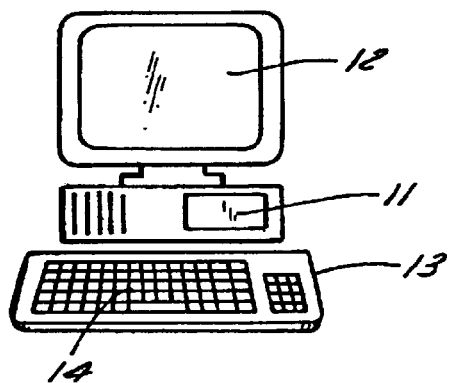
FIG. 1 illustrates schematically a computer with a keyboard, realised according to the present invention.
Figure 2:
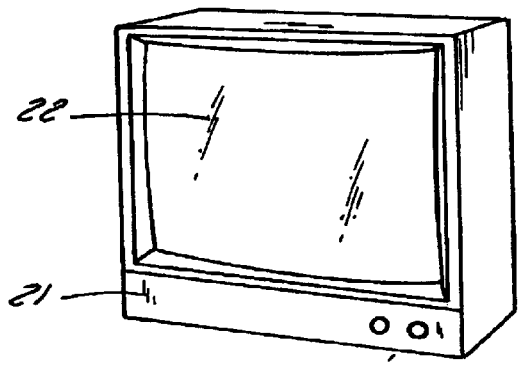
FIG. 2 illustrates schematically a TV-set and a remote control, realised according to the present invention.
Figure 3:
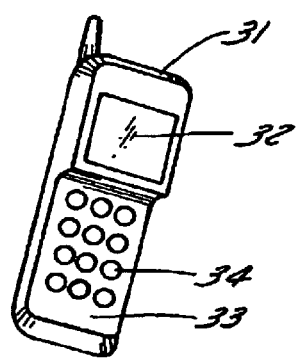
FIG. 3 illustrates schematically a mobile phone with an integrated key pad, realised according to the present invention.

In the FIGS. 1 through 3, examples of devices are outlined for which the present invention is of use and advantageous. In FIG. 1, a computer 11 is schematically illustrated, which is equipped with a presentation unit 12 in the shape of a screen. Keyboard 13 is arranged as a user interface, which keyboard serves as a control unit for the computer. Further, the keyboard is arranged in a known manner with a plurality of data input means in the shape of keys 14. The user gives control data to the keyboard by means of the keys and control signals are thereby transmitted from the keyboard in the figure, to the computer. Said communication connection could be wire dependent or wireless. In the computer there is an interpreting means comprising a computer program devised to decode the control signals, so as to interpret which action or measures the user has ordered.

FIG. 2 schematically illustrates a TV-set 21 that is equipped with a presentation unit 22 in the shape of a picture tube, plasma screen or similar. The control unit 23 is a remote control, on which buttons or keys 24 are arranged for the input of control data. Control signals are thereby transmitted from the remote control, by means of IR, bluetooth or cable, to the TV-set. In the TV-set, there is a receiver mounted, devised to act as an interpreting unit, for the purpose of interpreting which measures the user wants the TV-set to execute.

FIG. 3 schematically illustrates a mobile phone 31, equipped with a display 32. The control unit of the mobile phone is its key pad 33, which is integrated with the apparatus 31. The key pad is provided with buttons/keys 34, and in some cases rotary controls or similar. When the control unit and the apparatus are integrated, the transmission of control signal is provided by means of physical connections, for example through cables or wires formed on a printed circuit board.

Figure 4:
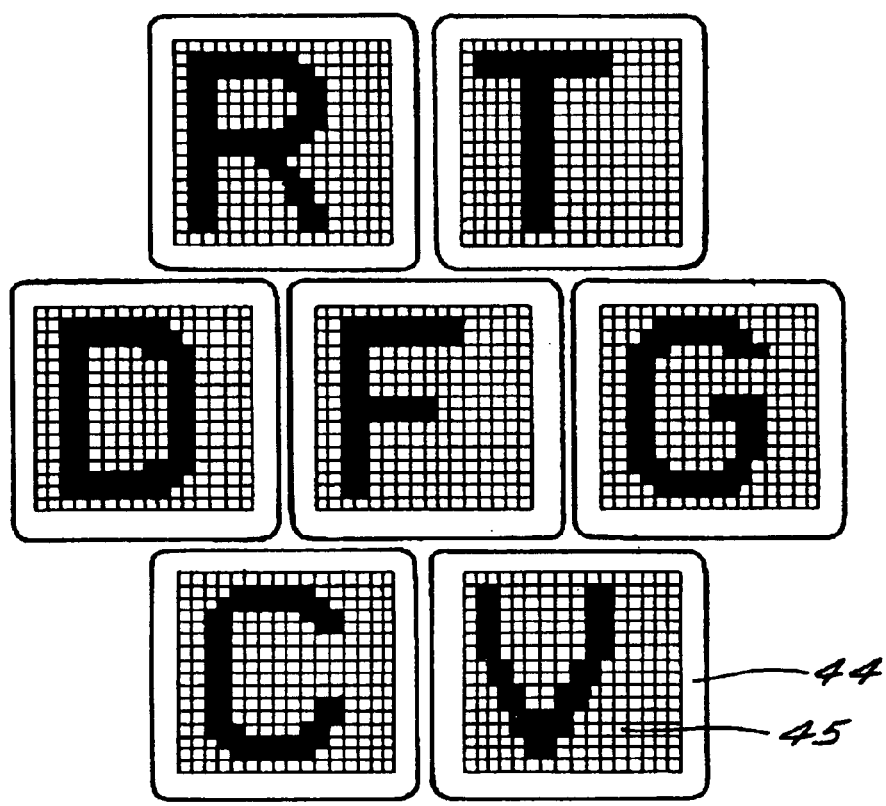
FIG. 4 illustrates schematically a number of keys with variable presentation means, according to the present invention.

Common for all embodiments of the present invention is that the data input means of the control units are equipped with a presentation means 45 enabling immediate reconfiguration of the data input means. In a preferred embodiment of the invention, outlined in FIG. 4, each data input means include a LCD (Liquid Crystal Display). In FIG. 4, the invention is illustrated for seven keys 44 of a computer keyboard, and it is understood that the arrangement with a display 45 on the key is valid for one or more of the control units' keys 44, rotary controls etc.

Equally, it is understood that the control unit can have an arbitrary number of keys. Consequently, the embodiment illustrated in FIG. 4 should merely be considered as an example aiming to clearly illustrate the invention.

In the preferred embodiment according to FIG. 4, each key comprises a 16×16 pixel LCD. Each display 45 is encapsulated, meaning that the display 45 is not compressed when the key is pushed down. The arrangement with these variable presentation means 45 on the keys 44 has consequently no mechanical importance for the function of the keys, which keys can be arranged in a known manner with a matrix decoder or as totally separated contactors.

Figure 5:
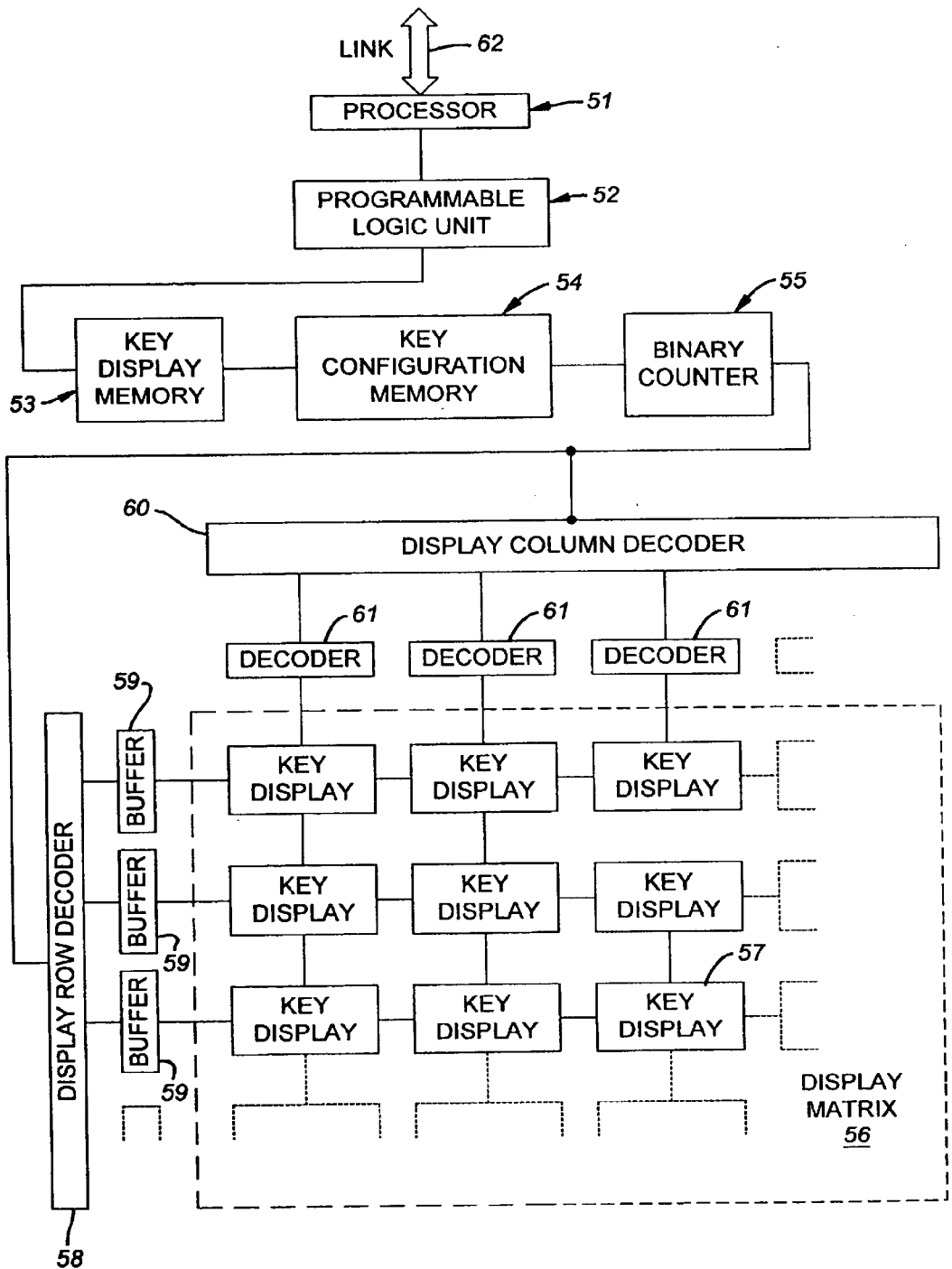
FIG. 5 illustrates schematically a preferred circuit solution for a control unit, according to the present invention.

Referring to FIG. 5, a preferred embodiment of the invention is described below, wherein said control unit is a computer keyboard. FIG. 5 shows schematically a preferred embodiment of a circuit solution for the control unit, i.e. the keyboard, according to the present invention. The control unit comprises a processor 51, arranged to handle the presentation means of the data input units, i.e. the displays on the keys. Through a PLD (Programmable Logic Unit) 52, the processor 51 is connected to a memory means in the form of a Flash ROM 53. Data representing the different visual indicators the displays are set to show are stored in this memory 53. Consequently, pixel data for a number of different characters is stored therein. To the PLD 52 and the memory 53 is also a second memory 54 connected, preferably a SRAM. In this second memory the configuration of the characters for the different keys of the keyboard is stored. In this second memory 54, information is consequently stored indicating that key i,j shall show the character R, key i,j+1 shall show the character T, etc. In this second memory 54 there are pointers, which point towards data stored in the first memory 53, for the characters included in the configuration defined in the second memory 54.

The keyboard is operated in two modes: Download and Operation. In the Download mode, the processor, which comprises an internal program and its own data memory, receives data from a computer. The received data comprises either appearance data for one or several keys, or configuration data with information on mapping of different characters on different keys. The appearance data thus describes the appearance for one or several separate keys, and therefor includes pixel data for a character or symbol. The configuration data describes the allocation of each character or symbol to different keys on the keyboard. When the Download mode is initiated, the PLD takes control of the data and addresses buses to memory banks. Received configuration data is stored in the memory 54, which enables rapid reconfiguration of the characters, while the appearance data for the characters is stored in the memory 53 for non-volatile storage when the current supply is turned off. When the Download mode is completed, the PLD's exits are set to high impedance mode, and will thereby not interfere with the bus during the Operation mode.

During the Operation mode, a binary counter 55 controls the address-lines to the configuration memory 54 by means of a clock pulse generator. The output data from the configuration memory 54, which goes through the characters for the current configuration in a cyclic manner, is used to address the high eight bits in the character memory 53. Simultaneously the counter 55 addresses the display matrix 56. In order to ease understanding, FIG. 5 shows only nine displays 57 in the matrix 56, but it is obvious to a person skilled in the art that an arbitrary number of displays can be included in the display matrix 56. The displays 57 correspond to the displays 45 in FIG. 4. Each display 57 corresponds to one key. The displays 57 of the matrix are addressed by the counter in a multiplexed manner, where rows and columns are addressed each in turn through a set of decoders and buffers. The decoder 58 circulates over the display rows, and the rows are addressed by means of a three-state buffer 59. Further, the decoder 60 is arranged to circulate through the display columns, and a decoder 61 is arranged to address pixel columns for each display column.

Preferably, the pixel columns of one display row are addressed at a time, in order to prevent the displays to flash at low frequencies. This is a solution comparable to the one used in TV interlacing, where odd and even rows are shown alternately. In a preferred embodiment of the invention, the decoder 60 first addresses the first display column. The decoder 58 circulates thereafter through the three-state buffers 59 from the first to the last row of the display, at which the pixel data for each pixel column is addressed by means of the first of the decoders 61. Thereafter, the decoder 60 addresses the second display column, and the output of pixel data to the respective display proceeds in a corresponding manner by cycling through the display rows.

Owing to the distinction between the data banks for the character configuration in memory 54 and the appearance of the characters in memory 53, the characters can quickly be rearranged into a new configuration without needing to download new characters to the keyboard. Thanks to the non-volatile nature of the Flash-ROM's memory 53, the characters do not have to be downloaded before each use of the keyboard. When downloading is needed, this is arranged through a suitable link 62 to a computer.

It should be noted that during the Operation mode the keyboard does not need to have access to a computer, which enables remote control of apparatuses. The keyboard must, however, have access to some sort of a power supply, preferably a battery. In a preferred embodiment said second memory 54 comprises configuration data for a number of pre-defined configurations of which only one can be active at a time. That enables a quick and easy rearrangement of the configuration of the keyboard for different purposes or users.

In the preferred embodiment of the present invention described above, nothing concerning the function of the keys has been mentioned. Irrespective of which character or symbol that is visually indicated on the keys, the same control signal is transferred from the keyboard to the computer at the activation of the keys. In an ordinary state of the art keyboard, which includes a matrix decoder, a scan code is transferred at the activation of a key, from the keyboard to the computer. In the keyboard according to the present invention, the transmission of the control signal, e.g. scan codes, can be transferred over the same communication link 62, used for downloading data to the keyboard, or through some other communication link. In the computer, there is a scan code interpreting means or a decoder in the form of a computer program, arranged to interpret, based upon said control signal, which action the user wants to perform. In the present invention, said code decoder is intimately associated with the character configuration for the keyboard arranged to control the computer.

For browsing and for selection of the configurations and the specific keys, the present invention includes a computer program product, which is preferably executable on the computer so that the control unit is adapted to control, i.e. the apparatus in what is now described. According to a first aspect, the computer program for selection is arranged to show a plurality of different character configurations to choose among. This is preferably done by visualizing the keyboards' 13 keys 14 on the computer's 11 screen 12, where each key is shown with the appearance and the location defined by the configuration in question. The computer program can be arranged to show one character configuration at a time, with the possibility to browse, or to show several different configurations simultaneously. According to this first aspect the computer program also includes means for selecting a specific character configuration, and means for transferring a quantity of data representing the selected character configuration to the control unit. In case the selected character configuration solely includes characters that are already stored in the memory 53 of the keyboard, the transmission of the new character configuration to the keyboard only brings about a change in the configuration memory 54. If new characters are also included, then also memory 53 is updated. According to a second aspect, the computer program is arranged to show a visualization of the keys of the keyboard, and a set of characters to choose among on the computer's screen. The characters to choose among can be shown on the screen in a matrix or a table and sorted in a alphabetic order, numeric order or by character type. With character type is meant for example letters, numbers, arrows etc. With the help of the mouse pointer, the appearance of the key can be selected by click-and-drag from the table to the key on the visualized keyboard to which one wishes to give the appearance in question.

Preferably one can also choose the action that is to be taken for each key. Preferably there are a number of standard keys where the action is predefined, for example the letters and the numbers. In a preferred embodiment, the action related to the selected character is the printout of the actual character at activation of the selected key. By choosing amongst different actions from a list, for example by using the mouse and different menus, the software will however allow a change of action.

During restructuring of the character configuration according to the second aspect, where in a very simple example, the A- and B-keys can be arranged to shift location, naturally, the control unit, i.e. the keyboard is also affected concerning the characters to be presented. In this example, the data is changed in memory 54, so that the present configuration points onto the correct character in memory 53 with regards to the characters A and B. The possible change of action that is selected, which action is to be taken at activation of the A- and B-key, respectively, is registered in the scan code decoder of the computer but does not affect the keyboard. In a preferred embodiment of the computer program according to said second aspect, visualizing means are also included, for visualizing, on a computer screen, a return location for characters whereby characters can be pulled from keys on the visualized keyboard by means of the mouse pointer and be placed in the return location. The computer program is thereby arranged to automatically, and preferably visually, put back the returned character to its location in the character table.

According to a third aspect, said computer program includes means for visualizing a character, wherein the possibility to edit the character is given. For the illustrated example in FIG. 4, where each character is represented by 16×16 pixels, such a pixel map is preferably visualized on the computer's 11 screen 12. The software subsequently enables marking of the pixels one wishes to activate, e.g. by means of the mouse pointer. When one has finished the editing, one clicks a OK-button presented by the computer program, at which the appearance for a new character is created. This character is then placed into the previously mentioned character table, in a location chosen by either the user or automatically by the computer program. In one embodiment the appearance data is also automatically downloaded to the keyboard for storage in memory 53. During construction or editing of a character, the possibility of selecting action is also given, according to what has been said above.

According to a fourth aspect, said computer program includes means for transfering picture data for an arbitrary picture to a file format that is adapted for presentation on the keys. Therefor, the computer program is arranged to split the information of a given picture into 16×16 pixels, and to visually present the transformed picture for the user on the computer screen. The transformed picture can then be edited according to the above-mentioned third aspect.

According to a preferred embodiment of the invention, the computer is communicatively connectable to a database in a communication network, e.g. the Internet. Further, the computer includes means for receiving and transmitting data from and to the above-mentioned database. By data is here meant both the separate appearance data for keys and the configuration data for the whole keyboard. The apparatus further comprises means for downloading configuration data and appearance data from said database, for the purpose of transmitting the downloaded data to the keyboard, where the data is stored in memories 53 and 54, respectively.

According to the invention, not only characters like letters and numbers can be selected, referring to the appearance and location. This could also be valid for keys that have other functions, like Shift, Alt and Return. Further, standard functions or actions, which on a keyboard are accessible only by means of combined key commands, can be configured on a specific key, at which only one keystroke is needed for the activation of the actual function or action. For example, a save button can be arranged and supplied with a suitable symbol.

According to a preferred embodiment of the invention, a key on a keyboard is arranged for browsing between the character configurations. The activation of this browse key firstly renders browsing of the visual indicators between different configurations, i.e. a change in the appearance of the keys on the keyboard, and secondly to a change in the computer's decoder, dependent on the changed appearance data, so that the scan codes are interpreted as the correct actions. The activation of this browse key consequently includes communication 62 between the keyboard and the computer. The functionality of the browse key makes it especially easy to reconfigure the key settings for the keyboard. This is especially advantageous when there is a limited number of keys, or at least fewer keys than the desired number of key functions. Consequently, the browse key can be arranged to be used as the Shift- or the Alt Gr-key. For example, in one embodiment, a keyboard could be arranged with a row of numeric keys at the top of the keyboard, as is normally the case, but where only the numbers are indicated on the keys' display in one mode. A single keystroke of the browse key will thereby replace the numbers with the alternative characters, corresponding to the combined activation of Shift and the respective key, i.e. the characters !, ", #. Additional activation of the browse key may render these alternative characters to be replaced with the next setting of alternative keys, which correspond to the combined activation of the Alt Gr key and the respective number key, i.e. @, £, etc. The result thereof is both that the keyboard can be made easier to interpret, since fewer characters are shown simultaneously on each keys, and also that all the keys on the keyboard can be arranged with one or more alternative keys that are clearly shown by browsing with the browse key. A particularly advantageous embodiment of the invention, arranged with the browse key, is where the apparatus is realized as a mobile phone 31. An ordinary mobile phone has a range of 12–15 keys 34, of which the number keys 0–9 are dominating. Text input, for example for an SMS message, can become both difficult and time consuming since the input of each character may demand up to four keystrokes. In a mobile phone according to the present invention, a plurality or all of the keys or buttons of the mobile phone are arranged with displays. During normal operation, when the number keys are mostly used, these keys are arranged to show the numbers only. During input of text, the browse key of the mobile phone is activated, rendering the displays on the number keys to show letters in stead. In one embodiment each key can assume the appearance of several different letters, whereby the text input progresses as normal. In another, and preferred, embodiment the number keys are reconfigured from showing 0–9 to show A–J at a first activation of the browse key. Additional activation of the browse key renders the keys to show the letters K–T, and so on. In accordance with what has been described for the embodiment wherein the apparatus is a computer, activation of the browse key naturally also renders the action taken upon the activation of corresponding key to changes when its appearance changes. In one embodiment the browse key is realized as two keys arranged to browse upwards and downwards, respectively, similar to what already is common for mobile phones for browsing in the menu system.

In another embodiment of the present invention, said control unit is arranged for controlling a number of different apparatuses. The control unit can e.g. be a central and portable control unit for controlling devices in so called intelligent homes. Thus, the control unit can be devised to be able to communicate with, e.g. the TV, the video recorder, the refrigerator, the answering machine etc. In a preferred embodiment the browse button is then used for quick and easy reconfiguration of the control unit to a key set that is adapted for an apparatus one wishes to control. Preferably, the control unit of this embodiment includes parts of what was included in the apparatus in the previously mentioned description of the embodiment with the computer and the keyboard, i.e. the computer itself. Thus, the embodiment with one control unit devised to control several different apparatuses is equipped with an interpreting unit, a decoder for scan codes or similar that are emitted upon a keystroke. The control unit is thereby devised to adapt outgoing control signals dependent on the character configuration, whereby browsing with the browse button between the different character configurations enables the communication with different apparatuses. With this arrangement, one push on the browse button can enable the control unit to show keys that are adapted for communication with the TV-set. Further browsing with the browse button causes, e.g. the character configuration on the control unit to assume the appearance of the suited symbols for communicating with a refrigerator in an intelligent home, for example the customer cart and different basic consumer goods.

Other advantages with the browsing functionality, when using a computer, is e.g. the capability to brows between mathematical or physical symbols, special writing or drawing characters, or to bring up a character configuration where different keys could show in a distinct visual manner a symbol for a computer program, at which the computer program could be activated by the activation of the respective keys. The functionality consequently enables a very simple execution of functions, which before demanded many keystrokes, alternatively combinations of several keys, or the use of a mouse. The invention is also usable to adapt control units in form of game consoles to game appliances like computer games or TV games. At that, different keys can be given different appearances reflecting different events, accessories etc. The invention also enables easy reconfiguration of the game consoles for different games or players.

Many examples of embodiments of the present invention have been described above, but many more imaginable applications and embodiments of the present invention are possible. The scope of the invention is only limited by the accompanying claims.

What is claimed is:

1. A system for controlling an apparatus, comprising a control unit adapted for transferring control signals to the apparatus dependent on control data, which control unit comprises data input means for input of said control data, where said apparatus comprises interpreting means adapted to translate said control signal to an action, wherein a visual indicator is arranged on said data input means to indicate the action the apparatus is arranged to execute upon activation of the data input means, wherein said data input means comprises a variable presentation means, wherein said control unit comprises a first storage means adapted to store appearance data which is presentable by said presentation means, a processor adapted to retrieve said appearance data and to transfer it to said presentation means for presentation thereon as a visual indicator, and a second storage means arranged to store a plurality of selectable objects of data, in which each data object comprises appearance data for a plurality of presentation means.

2. The system according to claim 1, in which said control unit comprises several separate data input means, each devised with a presentation means, wherein said first storage means is arranged to store a data object relating to a preset configuration of appearance data for different presentation means.

3. The system according to claim 1, in which each presentation means comprises separate displays, arranged to present a picture dependent on said appearance data.

4. The system according to claim 3, in which each data input means comprises contact means, arranged to detect activation of the corresponding data input means.

5. The system according to claim 4, in which said contact means of each data input means is activated independent of said presentation means.

6. The system according to claim 5, in which said display is a LCD with a plurality of pixels, where said appearance data includes pixel data.

7. The system according to claim 6, in which said apparatus comprises a presentation unit, and first means arranged to visually present, on said presentation unit, first selection data for said control unit, which first selection data comprises complete selectable configurations of characters, corresponding to said data objects, for the presentation means of the data input means.

8. The system according to claim 7, in which said first means is arranged to transfer information about selected configurations of characters to said control unit.

9. The system according to claim 8, in which said apparatus comprises second means arranged to visually present, on said presentation unit, second selected data for said control unit, which second selection data comprises a set of selectable characters for the presentation means of the data input means and a visualization of said data input means.

10. The system according to claim 9, in which said apparatus comprises a pointer means, and where the visual appearance of a data input means is variable by a transfer of an optional character from said set to an optional visualize data input means with said pointer means, for allocation of desired visual appearance to the desired data input means.

11. The system according to claim 10, in which said second means is arranged to present a return location, to which return location characters are movable with said pointer means, and in which said second means is arranged to, from said return location, return characters to predestined locations in said set.

12. The system according to claim 11, in which said second means is arranged to transfer information of a selected character of a data input means to said control unit.

13. The system according to claim 12, in which said apparatus comprises third means arranged to visually present third selection data for said control unit on said presentation means, which third selection data comprises a visualization of a character and means to edit the appearance of said character.

14. The system according to claim 13, in which said apparatus comprises means for transferring picture data for an arbitrary picture to a file format adapted for presentation of the picture on said presentation means.

15. The system according to claim 14, in which said apparatus is communicatively connectable to a database, and comprises means for retrieving data from the database, and transmitting data to the database.

16. The system according to claim 15, in which the apparatus comprises means for downloading appearance data for the data input means, and means for transferring said visual data to said control unit, for storage in said first storage means.

17. The system according to claim 16, in which the apparatus comprises means for downloading configuration data representing a complete configuration of characters for data input means, and means for transferring said configuration data to said control unit, for storage in said second storage means.

18. The system according to claim 17, in which said control unit comprises a browse data input means arranged to cause, when activated, a change from a first configuration of characters to a second, for the data input means of the control unit.

19. The system according to claim 18, wherein said browse data input means is arranged to, upon activation thereof, modify the interpreting unit of the apparatus to assign specific actions to specific control signals, and in accordance with the modification of the interpreting unit, modify the visual appearance of the presentation means of the data input means.

20. The system according to claim 19, in which said browse data input means is arranged to browse, when activated, between the configurations of characters stored in said second storage means.

21. The system according to any of the previous claims, in which said control unit is a remote control for said apparatus.

22. The system according to claim 21, in which said apparatus and control unit comprises means for wireless communication.

23. The system according to claim 22, in which said apparatus is a mobile phone, and said control unit comprises a set of keys integrated with the apparatus.

24. A system for controlling an apparatus comprising:
  (a) a computer that is the apparatus being controlled, with the computer having a processor that is configured to receive and act upon control signals received from a keyboard control unit; and
  (b) a keyboard control unit that is linked to the computer providing control signals thereto, the keyboard control unit comprising:
    (1) a plurality of rows of keys with each one of the keys of the plurality of rows of keys having its own key display;
    (2) an on-board processor configured to enable each key display to display an image;
    (3) a key display memory containing display image data for each one of the key displays;
    (4) a key configuration memory containing key display configuration data as to which display image data is to be displayed on each key display; and
    (5) a programmable logic unit configured to permit one of the display image data and the key display configuration data to be changed.

25. The system according to claim 24, wherein the processor on-board the keyboard control unit is linked to the programmable logic unit, the programmable logic unit is linked to the key display memory and the key configuration memory, and the programmable logic unit is configurable by the computer between (i) a download mode where one of display image data and key display configuration data is transferred from the computer to a corresponding one of the key display memory and the key configuration memory and stored therein, and (ii) an operation mode where display image data and key display configuration data cannot be transferred from the computer to either the key display memory or the key configuration memory.

26. The system according to claim 24, further comprising (i) a binary counter that is linked to the processor on-board the keyboard control unit, the key display memory and the key configuration memory, and (ii) a display matrix that is linked to the binary counter, the key display memory, and the key configuration memory, wherein the display matrix is comprised of the key displays arranged in an array.

27. The system according to claim 26, further comprising a display column decoder and a display row decoder that are each linked to the display matrix and linked to the binary counter, the key configuration memory and the key display memory.

28. The system according to claim 27, wherein the display matrix comprises a plurality of rows of the key displays and a plurality of columns of the key displays, and further comprising a buffer between each row of key displays and the display row decoder and a decoder between each column of key displays and the display column decoder.

29. The system according to claim 24, wherein the computer comprises a personal computer and the keyboard control unit comprises a computer keyboard.

30. The system according to claim 24, wherein each key display comprises a 16×16 pixel display.

31. The system according to claim 24, wherein each key display comprises an LCD display.

32. A system for controlling an apparatus comprising:
  (a) a computer that is the apparatus being controlled, with the computer having a processor that is configured to receive and act upon control signals received from a keyboard control unit; and
  (b) a keyboard control unit that is linked to the computer and that comprises:
    (1) a plurality of rows of keys with each one of the keys of the plurality of rows of keys having its own display;
    (2) an on-board processor configured to enable the key display of each one of the keys of the plurality of rows of keys to display an image;
    (3) a key display memory containing a plurality of sets of display image data for each one of the keys of the plurality of rows of keys; and
    (4) a key configuration memory containing key display configuration data as to which set of display image data is to actually be displayed on the key displays.

33. A system for controlling an apparatus comprising:
  (a) a computer that is the apparatus being controlled, with the computer having a processor that is configured to receive and act upon control signals received from a keyboard control unit;
  (b) a presentation unit linked to the computer;
  (c) a keyboard control unit that is linked to the computer and that comprises:
    (1) a plurality of rows of keys with each one of the keys of the plurality of rows of keys having its own key display; and
    (2) an on-board processor configured to enable the key display of each one of the keys of the plurality of rows of keys to display an image; and
  (d) wherein the processor of the computer is configured to visually present on the presentation unit, key display image data for at least one of the key displays, enable the key display image data to be manipulated, and enable the manipulated key display image data to be transferred to the keyboard control unit.

34. The system according to claim 33, wherein the processor of the computer is configured to visually present a plurality of sets of key display image data for a plurality of pairs of key displays, enable manipulation of key display image data for at least one key display of at least one set of key display image data, and thereafter facilitate transfer of the manipulated key display image data to the keyboard control unit and storage of the manipulated key display image data in the keyboard control unit.

35. The system according to claim 33, further comprising a mouse that is linked to the computer that is manipulable to select or edit key display image data of at least one of the key displays.

36. The system according to claim 33, wherein the processor of the computer is configured to break up a digitized picture into a plurality of images that each comprise separate key display image data for a plurality of key displays such that the plurality of images form the picture on the plurality of key displays.

37. The system according to claim 33, wherein the processor of the computer is configured to enable an action to be assigned to the key that corresponds to a particular key display.

38. A system for controlling an apparatus comprising:

a keyboard control unit that is linked to the apparatus and that comprises:
 (a) a plurality of rows and columns of keys, with each one of the keys of the plurality of rows and columns of keys comprising a display;
 (b) a processor configured to enable the key display of each one of the keys to display an image;
 (c) a key display memory containing a plurality of sets of display image data for each one of the key displays; and
 (d) a key configuration memory containing key display configuration data as to which set of display image data is to actually be displayed on the key displays.

39. A system for controlling an apparatus comprising:

a keyboard control unit that is linked to the apparatus and that provides control signals thereto, the keyboard control unit comprising:
 (a) a plurality of rows of keys with each one of the keys of the plurality of rows of keys having its own key display;
 (b) a processor configured to enable each key display to display an image;
 (c) a key display memory containing display image data for each one of the key displays;
 (d) a key configuration memory containing key display configuration data as to which display image data is to be displayed on each key display; and
 (e) a programmable logic unit configured to permit one of the display image data and the key display configuration data to be changed.

* * * * *